(12) United States Patent
Matsumoto et al.

(10) Patent No.: US 7,614,597 B2
(45) Date of Patent: Nov. 10, 2009

(54) SEAT SLIDE FOR VEHICLE

(75) Inventors: Tadashi Matsumoto, Shizuoka (JP); Yoshihiro Kanda, Aichi (JP); Harutoshi Fujii, Saitama (JP); Koji Uno, Saitama (JP)

(73) Assignees: Fuji Kiko Co., Ltd., Kosai-shi (JP); Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 541 days.

(21) Appl. No.: 11/384,396

(22) Filed: Mar. 21, 2006

(65) Prior Publication Data

US 2006/0226328 A1 Oct. 12, 2006

(30) Foreign Application Priority Data

Mar. 31, 2005 (JP) ............... 2005-100592

(51) Int. Cl.
*F16M 13/00* (2006.01)
(52) U.S. Cl. ............ 248/429; 280/735; 296/65.13
(58) Field of Classification Search ......... 248/429, 248/430; 296/65.13, 65.1, 65.01, 68.1; 324/207.2, 324/207.21, 207.24, 207.22, 251, 252; 280/735
See application file for complete search history.

(56) References Cited

U.S. PATENT DOCUMENTS

| | | | | |
|---|---|---|---|---|
| 5,772,173 | A | * | 6/1998 | Couasnon ............ 248/430 |
| 5,785,292 | A | * | 7/1998 | Muraishi et al. ........ 248/429 |
| 6,043,646 | A | | 3/2000 | Jansseune |
| 6,328,272 | B1 | * | 12/2001 | Hayakawa et al. ....... 248/429 |
| 6,784,774 | B1 | | 8/2004 | Okumura |
| 6,935,692 | B2 | * | 8/2005 | Nishide et al. ......... 297/344.11 |
| 7,005,848 | B2 | * | 2/2006 | Suzuki et al. .......... 324/207.26 |
| 7,066,521 | B2 | * | 6/2006 | Jung et al. ............. 296/65.13 |
| 2002/0060281 | A1 | * | 5/2002 | Okazaki et al. ......... 248/424 |
| 2003/0230696 | A1 | * | 12/2003 | Yamada et al. .......... 248/424 |
| 2004/0100388 | A1 | | 5/2004 | Yoshida et al. |
| 2004/0118990 | A1 | * | 6/2004 | Yokoi et al. ........... 248/424 |
| 2004/0196029 | A1 | | 10/2004 | Okumura et al. |
| 2005/0057065 | A1 | | 3/2005 | Endoh et al. |

FOREIGN PATENT DOCUMENTS

| | | |
|---|---|---|
| CN | 1513695 | 7/2004 |
| JP | 59-001634 | 1/1984 |
| JP | 04-163237 | 6/1992 |
| JP | 2001-130369 A | 5/2001 |
| JP | 2004-20491 A | 1/2004 |

(Continued)

*Primary Examiner*—Kimberly T Wood
(74) *Attorney, Agent, or Firm*—Rankin, Hill & Clark LLP

(57) ABSTRACT

A seat slide for a vehicle, including a lower rail fixed to a floor of the vehicle, an upper rail fixed to a seat of the vehicle, a lock plate disposed within an inner space between the lower and upper rails and secured to the lower rail, a latch lever with a pawl which is disposed within the inner space and pivotally supported by the upper rail, and a position sensor for detecting a position of the upper rail relative to the lower rail, the position sensor being mounted to the upper rail such that a sensing portion thereof is disposed within the inner space and opposed to the lock plate.

21 Claims, 9 Drawing Sheets

FOREIGN PATENT DOCUMENTS

| | | |
|---|---|---|
| JP | 2004-161090 A | 6/2004 |
| JP | 2004-203150 A | 7/2004 |
| JP | 2004-259455 | 9/2004 |
| JP | 2004-330864 | 11/2004 |
| WO | WO 96/07112 A1 | 3/1996 |

* cited by examiner

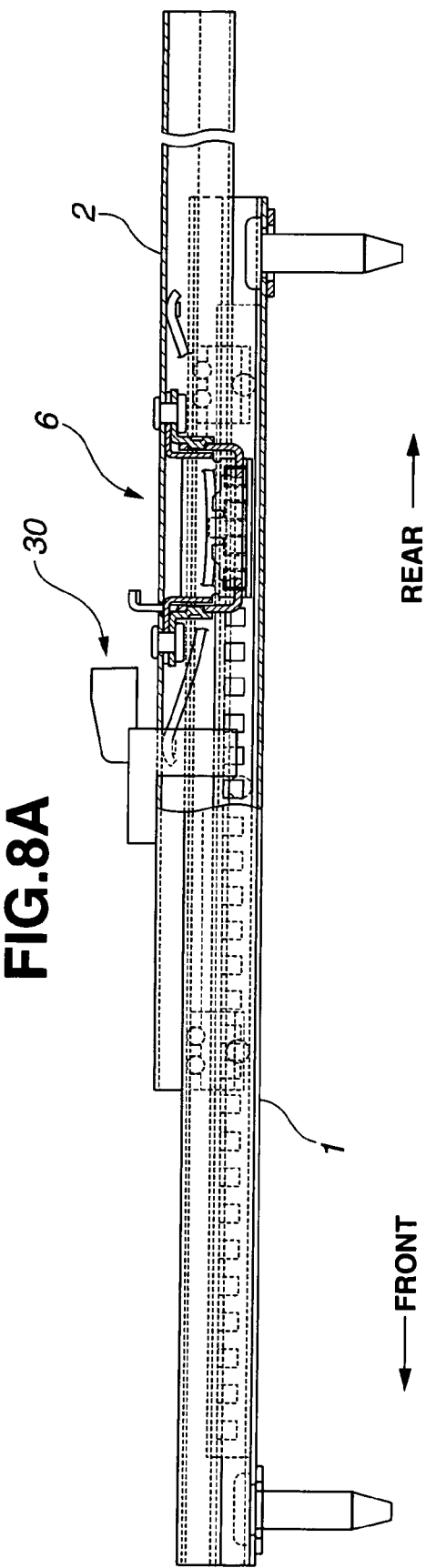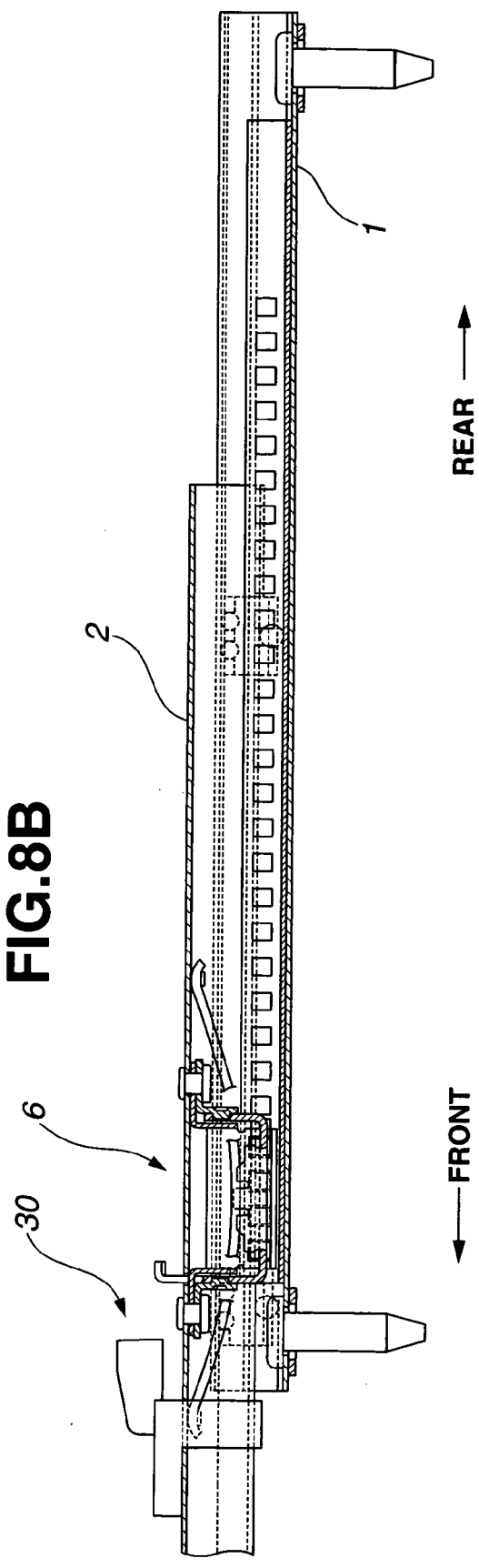

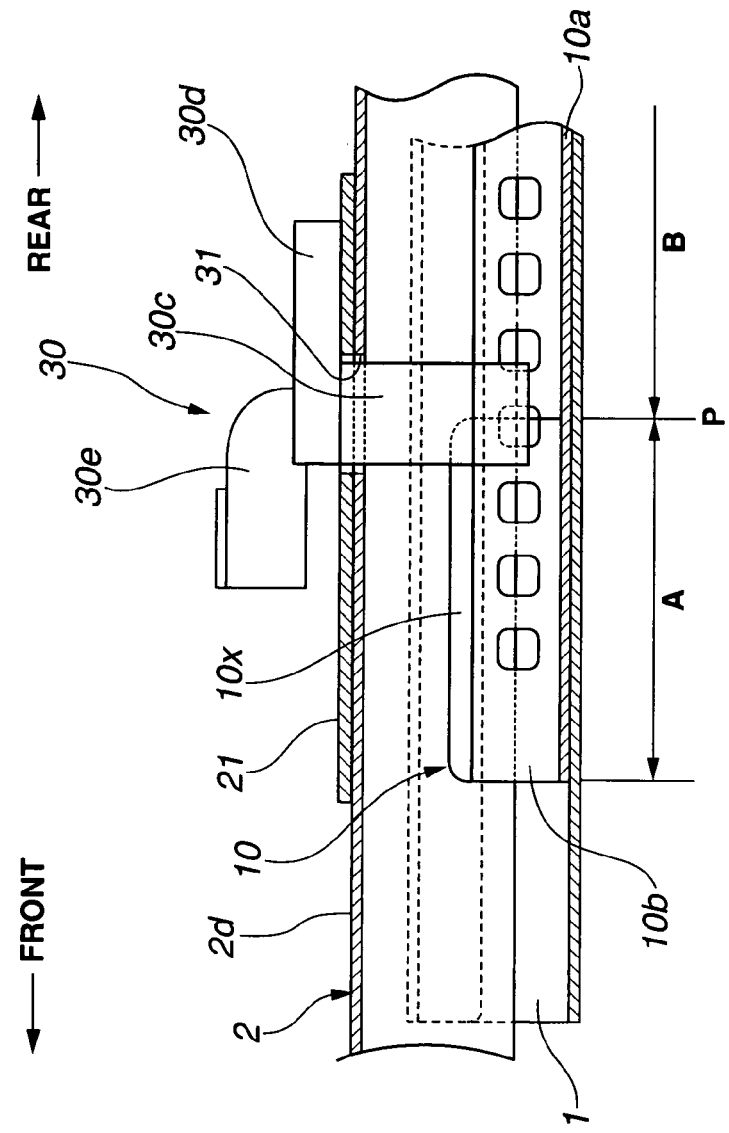
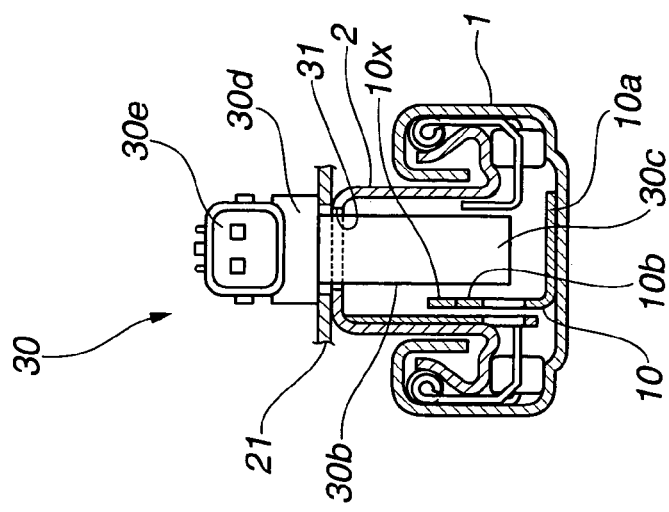

US 7,614,597 B2

SEAT SLIDE FOR VEHICLE

BACKGROUND OF THE INVENTION

The present invention relates to a seat slide for a vehicle, and specifically to a seat slide with a seat position sensing device.

In recent years, motor vehicles are equipped with air bag apparatus for protecting a driver and a passenger. On the other hand, a vehicular seat has a mechanism for adjusting a seat position in a fore-and-aft direction of the vehicle.

Japanese Patent Application First Publication No. 2004-203150, corresponding to United States Patent Application Publication No. 2005/0057065 A1, shows a seat position sensing apparatus for a vehicle. The seat position sensing apparatus includes a sensor that is provided on an outside surface of an upper rail and senses an upper surface of a lower rail to thereby detect a position of the upper rail relative to the lower rail.

SUMMARY OF THE INVENTION

However, since the sensor is disposed on the outside surface of the upper rail, the sensor may sense an object other than the lower rail or be damaged by interference with the object within an inside space of the vehicle.

It is an object of the present invention to provide a vehicular seat slide with a seat position sensor capable of overcome the above problem.

In one aspect of the present invention, there is provided a seat slide for a vehicle, comprising:
  a lower rail fixed to a floor of the vehicle, the lower rail having a channel structure;
  an upper rail fixed to a seat of the vehicle, the upper rail being slidably engaged with the lower rail and having a channel structure cooperating with the channel structure of the lower rail to define an inner space therebetween;
  a lock plate disposed within the inner space between the lower and upper rails and secured to the lower rail;
  a latch lever with a pawl, the latch lever being disposed within the inner space between the lower and upper rails and pivotally supported by the upper rail so as to be movable between a lock position where the pawl is engaged with the lock plate and an unlock position where the pawl is disengaged from the lock plate; and
  a position sensor for detecting a position of the upper rail relative to the lower rail, the position sensor being mounted to the upper rail such that a sensing portion thereof is disposed within the inner space between the lower and upper rails and opposed to the lock plate.

In a further aspect of the present invention, there is provided a seat position sensing apparatus for a vehicle, the seat position sensing apparatus comprising:
  a fixed rail fixed to a floor of the vehicle, the fixed rail having a channel structure;
  a movable rail fixed to a seat of the vehicle and having a channel structure cooperating with the channel structure of the fixed rail to define an inner space therebetween, the movable rail being slidably engaged with the fixed rail;
  a lock mechanism for locking the movable rail on the fixed rail, the lock mechanism including a first engaging member which is disposed within the inner space between the fixed and movable rails and secured to the fixed rail, and a second engaging member that is disposed within the inner space between the fixed and movable rails and pivotally supported by the movable rail so as to be movable between a lock position where the second engaging member is engaged with the first engaging member and an unlock position where the second engaging member is disengaged from the first engaging member; and
  a position sensing means for detecting a position of the movable rail relative to the fixed rail, the position sensing means being mounted to the movable rail so as to sense the first engaging member within the inner space between the fixed and movable rails.

BRIEF DESCRIPTION OF THE DRAWINGS

FIGS. 8A and 8B are an explanatory diagram showing an operation of the seat slide of the first embodiment.

FIG. 9A is a view similar to FIG. 3A, but showing a second embodiment.

FIG. 9B is a view similar to FIG. 3B, but showing the second embodiment.

DETAILED DESCRIPTION OF THE INVENTION

Figure 1:
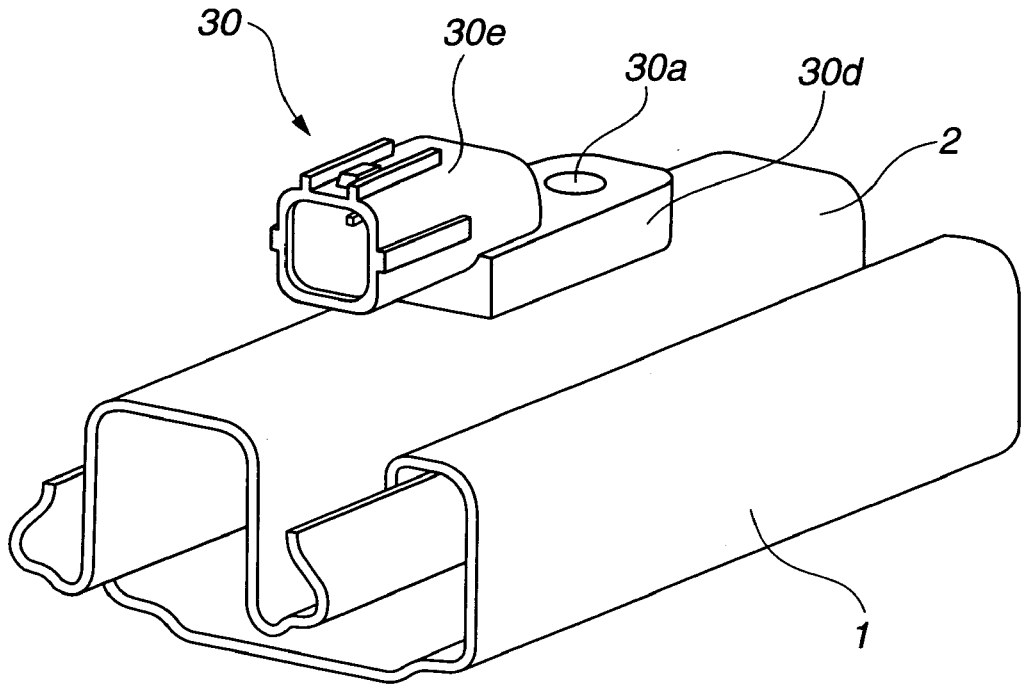
FIG. 1 is a perspective view of a part of a seat slide of a first embodiment according to the present invention, showing a position sensor mounted to an upper rail.

In the following, first to third embodiments of the present invention will be described in detail with reference to the accompanying drawings. For ease of understanding, various directional terms, such as, right, left, upper, lower, upward, downward, etc., are used in the following description, but such terms are to be understood with respect to a drawing or drawings on which the corresponding part or portion is shown. Referring to FIGS. 1-8B, a seat slide for a vehicle, according to the first embodiment of the present invention is explained. As illustrated in FIG. 1, the seat slide includes lower rail 1, upper rail 2 slidably engaged with lower rail 1 and position sensor 30 disposed on upper rail 2. Lower rail 1 is fixed to a floor of the vehicle. Upper rail 2 is fixed to a lower side surface of a seat of the vehicle.

Figure 5:
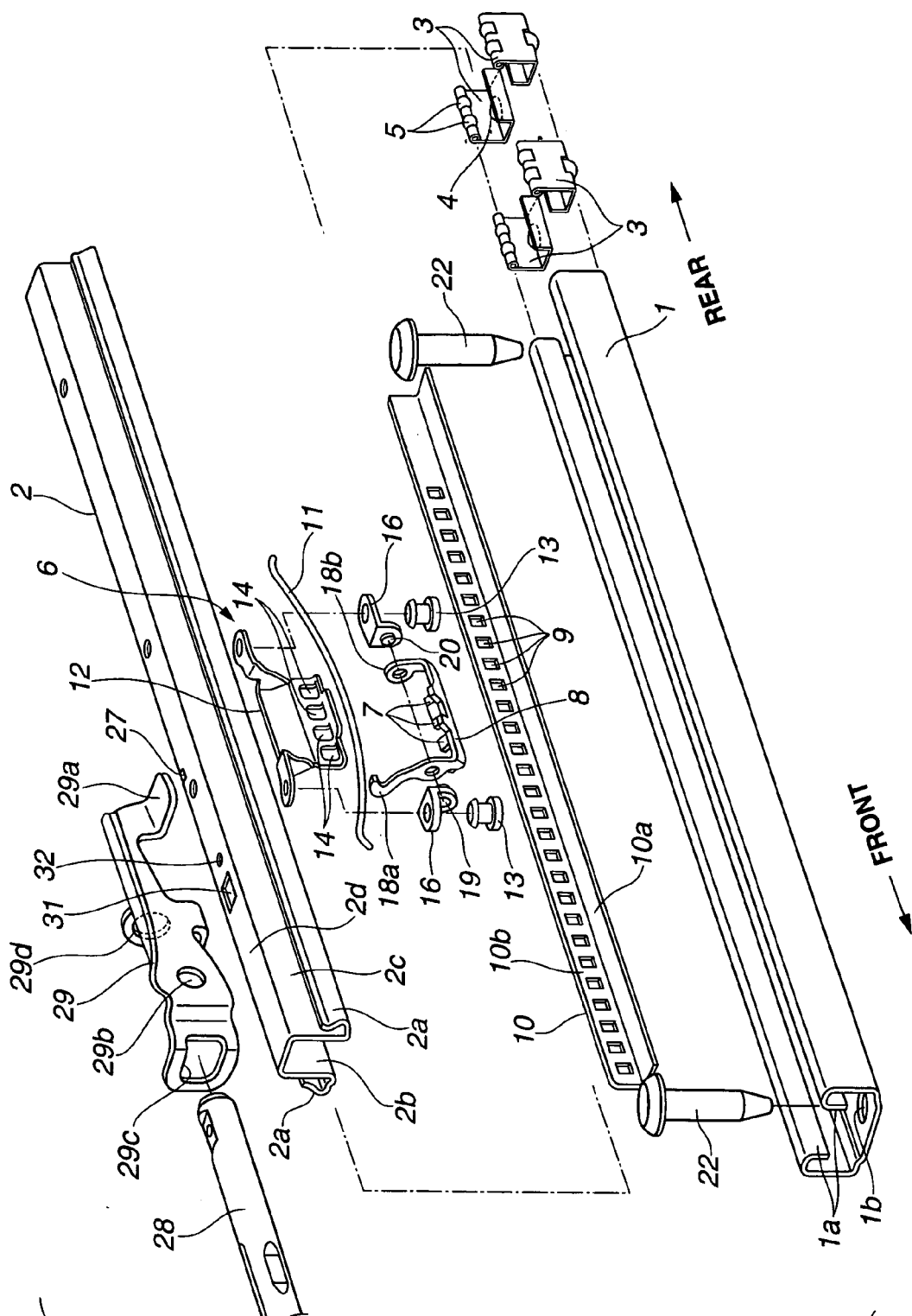
FIG. 5 is an exploded perspective view of the seat slide of the first embodiment.

Specifically, as illustrated in FIG. 5, there is shown the seat slide except for position sensor 30. Upper rail 2 is slidably engaged with lower rail 1 in a longitudinal direction thereof, namely, in a fore-and-aft direction of the vehicle, through rollers 4 and guide balls 5. Rollers 4 and guide balls 5 are held by retainers 3. Lower rail 1 has a channel structure that has a generally U-shape in cross section. Lower rail 1 includes a lower base wall, two spaced side walls upwardly extending from side edges of the base wall, and two upper bends 1a that are bent downwardly and inwardly at upper edges of the side walls and define an upper opening therebetween. Holes 1b are formed in opposite end portions of the base wall in the longitudinal direction. Lower rail 1 is fixed to the vehicle floor by fastening bolts 22 that are inserted through holes 1b. Upper rail 2 has a channel structure having a generally reversed U-shape in cross section. Upper rail 2 includes upper base wall 2d, two spaced side walls 2b, 2c downwardly extending from side edges of upper base wall 2d, and two lower bends 2a bent upwardly and outwardly at lower edges of side walls 2b, 2c which define a lower opening therebetween. Upper rail 2 is engaged in the upper opening of lower rail 1 so that the channel structure of upper rail 2 cooperates with the channel structure of lower rail 1 to define an inner space therebetween.

Lock mechanism 6 for locking upper rail 2 in a position on lower rail 1 is disposed within the inner space between lower rail 1 and upper rail 2. Lock mechanism 6 includes latch lever 8 with a plurality of pawls 7, lock plate 10 with a plurality of lock holes 9 engageable with pawls 7, bar spring 11 that biases latch lever 8 in such a direction as to establish engagement of pawls 7 with lock holes 9, and pawl supporting bracket 12 with a plurality of retainer holes 14 engageable with pawls 7.

Latch lever 8 is pivotally disposed within upper rail 2. Latch lever 8 has a generally U-shaped structure as shown in FIG. 5 and includes a base portion on which pawls 7 are integrally formed and two side arms 18a, 18b which upwardly extend from opposed ends of the base portion. One side arm 18a is longer than the other side arm 18b and acts as an input arm to which external force is applied. Latch lever 8 is pivotally supported on upper rail 2 through a pair of support brackets 16 which are mounted onto an inside surface of upper base wall 2d of upper rail 2 by means of rivets 13, respectively. Support brackets 16 have pivot pins 19, 20 which are inserted into holes formed in side arms 18a, 18b of latch lever 8. Thus, latch lever 8 is pivotally supported on pivot pins 19, 20 of support brackets 16. Latch lever 8 is operated by the external force input thereto via one side arm 18a to pivot about a common axis that extends through pivot pins 19 and 20 in parallel to upper rail 2.

Figure 7:
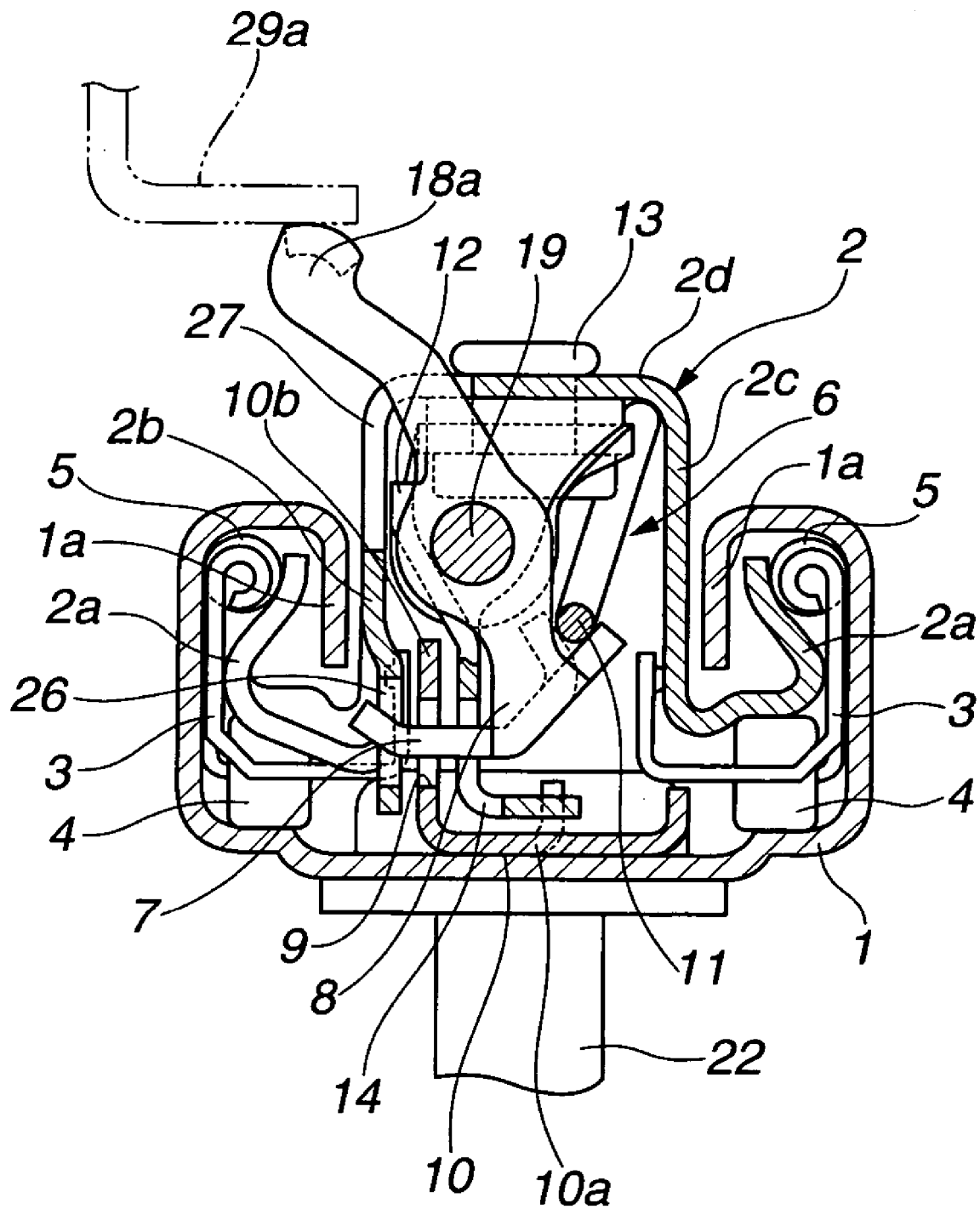
FIG. 7 is a section of the seat slide of the first embodiment, taken along line 7-7 of FIG. 6.

Lock plate 10 is secured to the base wall of lower rail 1. Lock plate 10 has an elongated shape so as to extend over a predetermined region in the longitudinal direction of lower rail 1. Lock plate 10 has a generally L-shape in section and includes lower base wall 10a and upright side wall 10b that extends substantially perpendicularly, namely, upwardly as shown in FIG. 5, from a side edge of lower base wall 10a. Upright side wall 10b also longitudinally extends over an entire length of lower base wall 10a. Lower base wall 10a is fixed to a middle portion of an inside surface of the base wall of lower rail 1 in a width direction perpendicular to the longitudinal direction by spot welding, projection welding or the like. Upright side wall 10b has a plurality of lock holes 9 which are engageable with pawls 7 of latch lever 8 and arranged along the longitudinal direction of lock plate 10. As shown in FIG. 7, upright side wall 10b is disposed between pawl supporting bracket 12 and one side wall 2b of upper rail 2.

Figure 6:
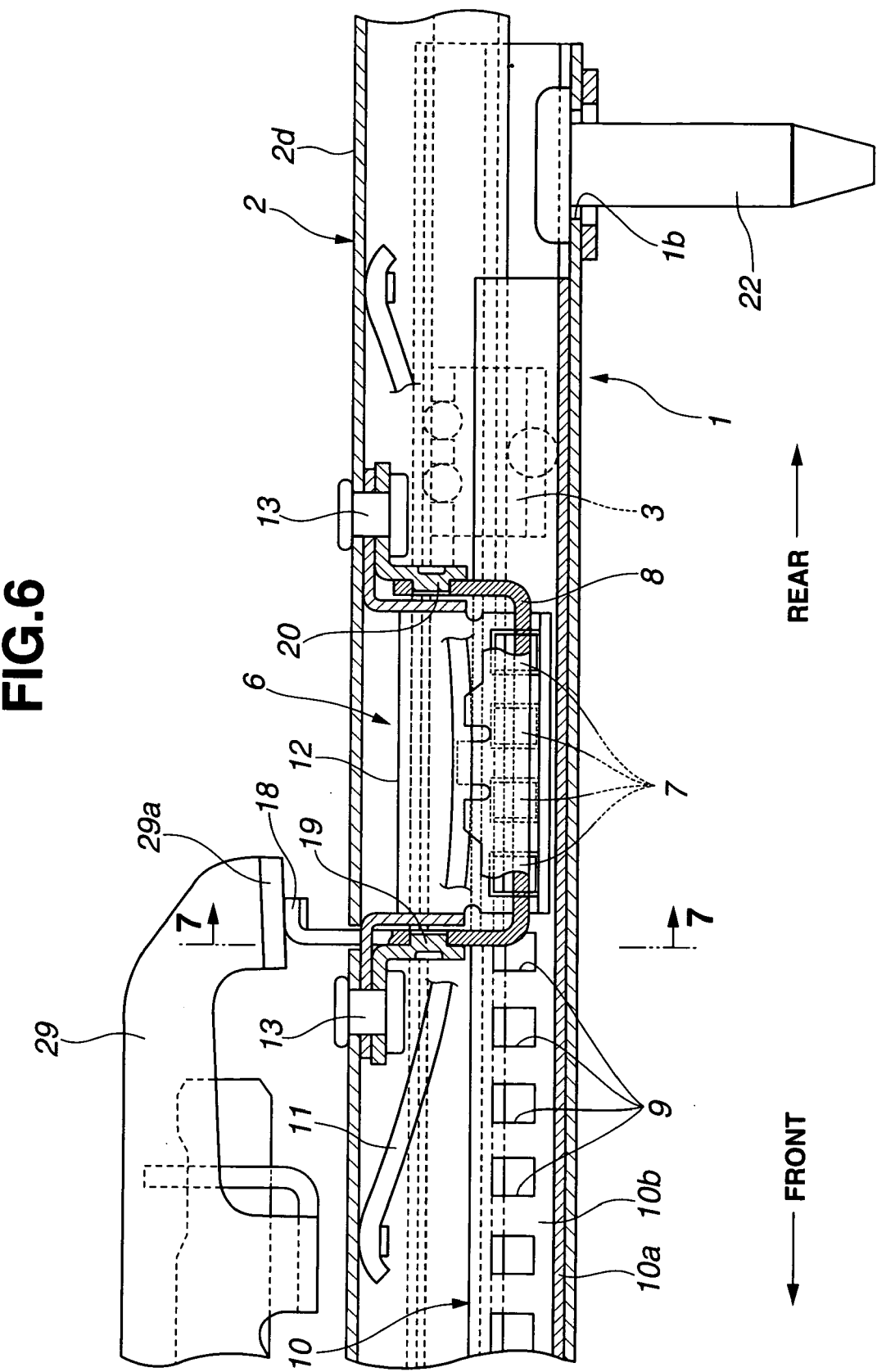
FIG. 6 is a longitudinal section of a part of the seat slide of the first embodiment.

Bar spring 11 has opposed end portions and a downwardly curved middle portion between the opposed end portions. The opposed end portions are fitted to upper base wall 2d of upper rail 2 as shown in FIG. 6. The downwardly curved middle portion biases latch lever 8 to displace tip end portions of pawls 7 of latch lever 8 toward one side wall 2b of upper rail 2.

Pawl supporting bracket 12 is fixed to a substantially middle portion of upper wall 2d of upper rail 2 in the longitudinal direction by means of a pair of rivets 13. Pawl supporting bracket 12 has a plurality of retainer holes 14 near a lower end thereof. Pawls 7 of latch lever 8 are inserted through retainer holes 14 and engaged therein.

Figure 2:
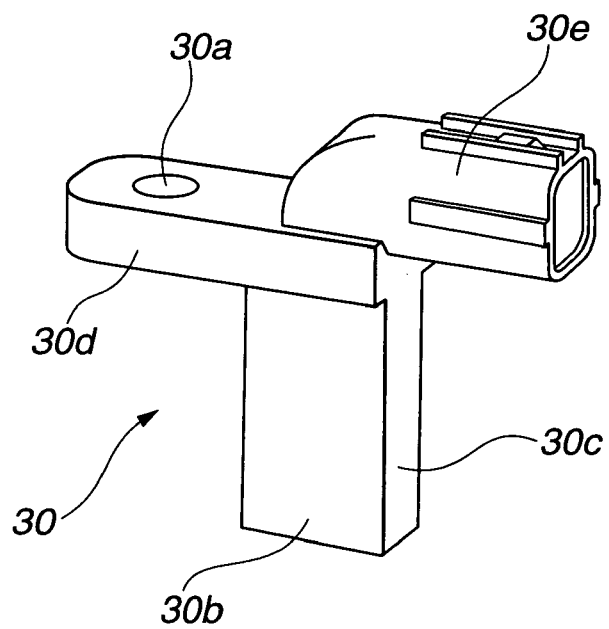
FIG. 2 is a perspective view of the position sensor shown in FIG. 1.

As illustrated in FIG. 7, retainer holes 26 are formed in one side wall 2b of upper rail 2 in alignment with retainer holes 14 of pawl supporting bracket 12. The tip end portions of pawls 7 of latch lever 8 are engaged in retainer holes 26 when lock mechanism 6 is in a lock condition. In addition, cutout 27 is formed at an upper side corner of upper rail 2 so as to continuously extend between one side wall 2b and upper wall 2d. As shown in FIG. 5, cutout 27 is located in a substantially middle position in the longitudinal direction of upper rail 2. Input arm 18a of latch lever 8 slightly projects outside from upper rail 2 through cutout 27. Further, through hole 31 and tapped hole 32 are formed in upper wall 2d of upper rail 2. Position sensor 30 as shown in FIG. 2 is fitted into through hole 31 and fixed to upper wall 2d of upper rail 2 by means of a fastening bolt, not shown, that is screwed into tapped hole 32.

Figures 3A, 3B:
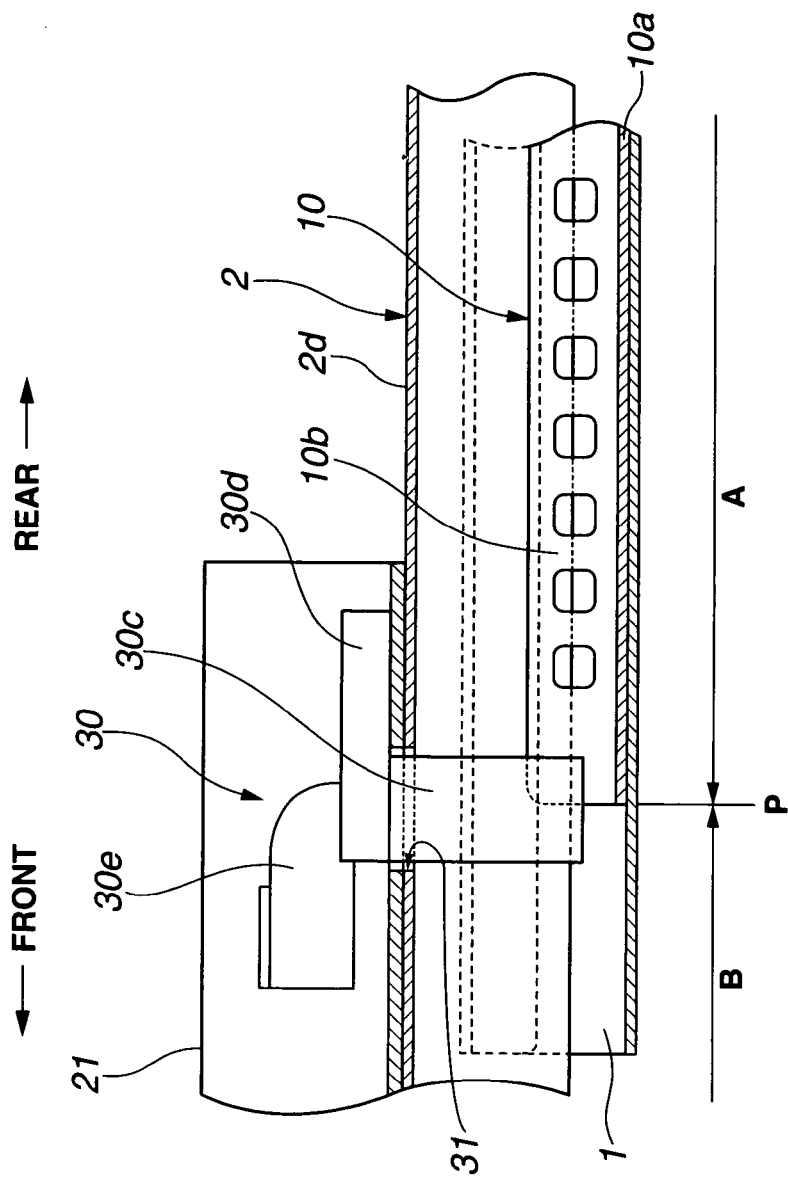
FIG. 3A is a lateral section of the seat slide of the first embodiment, taken in a direction perpendicular to a longitudinal direction of the seat slide, which shows the upper rail, a lower rail engaged therewith and the position sensor mounted to the upper rail.
FIG. 3B is a longitudinal section of the seat slide of the first embodiment.

As illustrated in FIG. 5, holder 29 is provided for operating a tip end portion of input arm 18a in an up-and-down direction. Holder 29 is supported by L-shaped support bracket 21 that is mounted on upper wall 2d of upper rail 2 as shown in FIG. 3A. Support bracket 21 has an L-shape in section and holes located corresponding to through hole 31 and tapped hole 32 of upper wall 2d of upper rail 2. Holder 29 has actuating lug 29a at a rear end portion thereof which contacts and actuates the tip end portion of input arm 18a. Holder 29 also has opening 29b at a front portion thereof into which a pivot pin, not shown, is inserted. Holder 29 is pivotally moveable about the pivot pin. Further, actuating lever 28 as shown in FIG. 5 is provided for operating actuating lug 29a of holder 29. Actuating lever 28 has a generally U-shape and is located below the seat such that a middle portion of actuating lever 28 is positioned on a front-lower side of the seat. A rear end of one side portion of U-shaped actuating lever 28 is inserted into two aligned openings 29c, 29d of holder 29. When the middle portion of actuating lever 28 is actuated to move upwardly, actuating lug 29a of holder 29 downwardly pushes input arm 18a to thereby pivotally move latch lever 8 against the biasing force of bar spring 11.

Referring back to FIGS. 1, 3A and 3B, position sensor 30 for detecting a position of upper rail 2 relative to lower rail 1 is fixedly mounted to upper wall 2d of upper rail 2 through support bracket 21. Position sensor 30 is arranged forward of latch lever 8 of lock mechanism 6 in the fore-and-aft direction of the vehicle. In this embodiment, position sensor 30 is a proximity sensor of a magnetic field-sensitive type. As illustrated in FIG. 2, position sensor 30 includes sensing portion 30c acting to sense lock plate 10, mount portion 30d that is mounted to upper wall 2d of upper rail 2, and wiring portion 30e for electric wiring. Mount portion 30d is formed with bolt insertion hole 30a. As illustrated in FIG. 3B, sensing portion 30c is fitted into through hole 31 of upper wall 2d of upper rail 2 and the corresponding hole of support bracket 21. Mount portion 30d is secured to upper wall 2d of upper rail 2 by means of the fastening bolt that is inserted into bolt insertion hole 30a through tapped hole 32 of upper wall 2d and the corresponding hole of support bracket 21. As illustrated in FIG. 3A, sensing portion 30c downwardly extends to be disposed within the inner space between lower rail 1 and upper rail 2. Sensing portion 30c has sensing surface 30b that senses upright side wall 10b of lock plate 10 when opposed to an inner side surface of upright side wall 10b. Wiring portion 30e is disposed on mount portion 30d and connected to a controller, not shown.

Figure 4A:
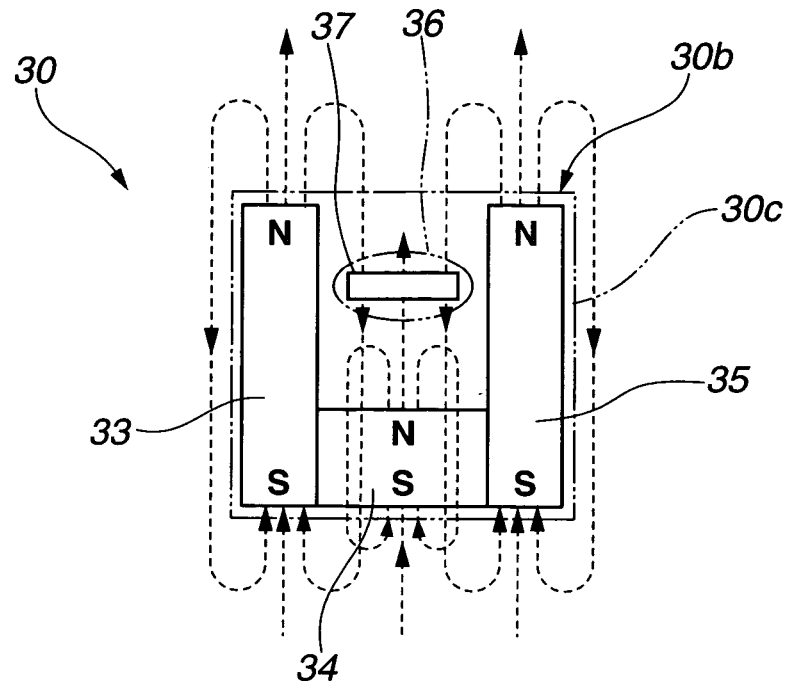
FIG. 4A is an explanatory diagram showing a principle of the position sensor.

Referring to FIG. 4A, the sensing principle of position sensor 30 is explained. As illustrated in FIG. 4A, position sensor 30 includes first magnet 33, second magnet 34 and third magnet 35 which are arranged in the shape of the letter U as viewed in a plan view. In this state, magnetic circuits are symmetrically formed along respective first, second and third magnets 33, 34 and 35. Therefore, there are provided magnetic fields symmetrically formed by respective first, second and third magnets 33, 34 and 35. In this condition, three N poles of first, second and third magnets 33, 34 and 35 repel one another, whereby there occurs magnetic flux-free region 36 between the three N poles of first, second and third magnets 33, 34 and 35 on which zero magnetic force is exerted. Hall IC 37 is fixed into magnetic flux-free region 36, to which an electric current corresponding to the zero magnetic force is output. Japanese translation No. 9-511357 of International Application Publication No. WO96/07112 corresponding to U.S. Pat. No. 6,043,646 describes a proximity switch with magnetic field-sensitive sensor.

Figure 4B:
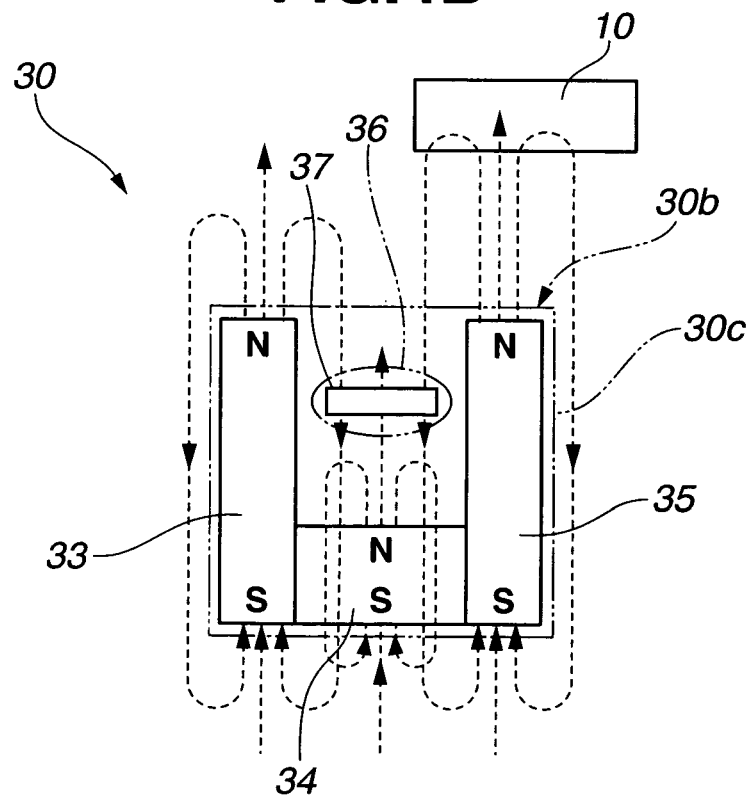
FIG. 4B is an explanatory diagram showing an operation of the seat slide of the first embodiment.

In contrast to FIG. 4A, FIG. 4B shows a condition where lock plate 10 of the seat slide is positioned upward of position sensor 30 as viewed in FIG. 4B. In this condition, the magnetic fields generated in first, second and third magnets 33, 34 and 35 of position sensor 30 are varied depending on the position of lock plate 10. A magnetic force corresponding to the variation in magnetic field is exerted on region 36, and an electric current corresponding to the magnetic force is generated in Hall IC 37. The electric current generated is read by the controller, not shown, so that the position of upper rail 2 with respect to lower rail 1 is detected.

In other words, the position of upper rail 2 with respect to lower rail 1 indicates a position of the seat in the fore-and-aft direction of the vehicle. When the seat is located in a forward position in the fore-and-aft direction of the vehicle, a speed of development of an air bag is to be reduced. On the other hand, when the seat is located in a rearward position in the fore-and-aft direction of the vehicle, the speed of development of an air bag is to be increased. Thus, the speed of development of an air bag can be controlled depending on the position of the seat in the fore-and-aft direction of the vehicle. Hall IC 37 of proximity sensor 30 is connected to the controller through wiring portion 30e as shown in FIG. 2.

FIGS. 3A and 3B illustrate a positional relationship between lock plate 10 and position sensor 30 in the form of the magnetic field-sensitive proximity sensor as explained above. As illustrated in FIG. 3A, sensing surface 30b of sensing portion 30c of position sensor 30 is opposed to the inner side surface of upright side wall 10b of lock plate 10 within the inner space between lower rail 1 and upper rail 2. When sensing surface 30b is thus opposed to the inner side surface of upright side wall 10b of lock plate 10, position sensor 30 senses lock plate 10 and therefore detects the seat position in the fore-and-aft direction of the vehicle. As illustrated in FIG. 3B, there is boundary point P between region A and region B in the fore-and-aft direction of the vehicle. That is, boundary point P is located at a boundary between region A and region B and positioned at a front end of upright side wall 10b of lock plate 10 in the fore-and-aft direction of the vehicle. When position sensor 30 is placed within region A, sensing surface 30b of sensing portion 30c of position sensor 30 is opposed to the inner side surface of upright side wall 10b of lock plate 10. At this time, position sensor 30 senses lock plate 10 and detects that the seat is retreated and placed in the rearward position in the fore-and-aft direction of the vehicle. In contrast, when position sensor 30 is placed within region B, sensing surface 30b of sensing portion 30c of position sensor 30 is not opposed to the inner side surface of upright side wall 10b of lock plate 10. At this time, position sensor 30 is disabled from sensing lock plate 10 and detects that the seat is advanced and placed in the forward position in the fore-and-aft direction of the vehicle.

An operation of the seat slide of the first embodiment will be explained hereinafter. When the seat is locked in a desired slide position, latch lever 8 is urged to pivotally move toward lock plate 10 by the biasing force of bar spring 11 and placed in a lock position as shown in FIG. 7. In the lock position, pawls 7 of latch lever 8 are engaged in retainer holes 14 of pawl supporting bracket 12, lock holes 9 of upright side wall 10b of lock plate 10 and retainer holes 26 of one side wall 2b of upper rail 2. Thus, latch lever 8 is locked with engagement with the three members, namely, pawl supporting bracket 12, lock plate 10 and upper rail 2. With this engagement of latch lever 8 with the three members, upper rail 2 is fixed to lower rail 1.

When the seat is moved from the position in which latch lever 8 is placed in the lock position as shown in FIG. 7, the middle portion of actuating lever 28 below the seat is upwardly pulled, latch lever 8 is pivotally moved from the lock position to an unlock position against the biasing force of bar spring 11. In the unlock position, pawls 7 are disengaged from retainer holes 14, lock holes 9 and retainer holes 26. Thus, latch lever 8 is placed in the unlock position so that upper rail 2 is permitted to slidably move on lower rail 1 and thereby the seat is enabled to move to a desired slide position. When the seat is moved to the desired slide position and then the middle portion of actuating lever 28 is released, latch lever 8 is urged to return to the lock position by the biasing force of bar spring 11. In the lock position, pawls 7 are again engaged with retainer holes 14, lock holes 9 and retainer holes 26 so that upper rail 2 is also fixed to lower rail 1 and the seat is locked in the desired slide position.

In accordance with the slide position in which the seat is placed, position sensor 30 is placed within region A or region B as shown in FIG. 3B. As illustrated in FIG. 3B, when position sensor 30 is placed within region A, sensing surface 30b of sensing portion 30c of position sensor 30 is opposed to upright side wall 10b of lock plate 10. In this condition, position sensor 30 senses upright side wall 10b of lock plate 10 and generates an output indicating that the seat is placed in the slide position rearward retreated in the fore-and-aft direction of the vehicle. FIG. 8A illustrates the most-retreated position. In contrast, when position sensor 30 is placed within region B, sensing surface 30b of sensing portion 30c of position sensor 30 is not opposed to upright side wall 10b of lock plate 10. In this condition, position sensor 30 is disabled from sensing upright side wall 10b of lock plate 10 and generates no output. This indicates that the seat is placed in the slide position forward advanced in the fore-and-aft direction of the vehicle. FIG. 8B illustrates the most-advanced position.

In the thus-constructed seat slide of the first embodiment of the present invention, position sensor 30 conducts detection of lock plate 10 within the inner space that is defined between lower rail 1 and upper rail 2. This can prevent occurrence of erroneous detection of lock plate 10 or prevent position sensor 30 from being damaged by interference with an object within an inside space of the vehicle, in contrast to the aforementioned conventional seat slide in which the detection of lock plate 10 is conducted outside the upper rail.

Further, with the formation of through hole 31 in upper wall 2d of upper rail 2, position sensor 30 can be mounted to upper rail 2. Therefore, the existing seat slide can be used without large change in design. This results in reduction of the production cost of the seat slide.

Further, since the inner side surface of upright side wall 10b of lock plate 10 is sensed by sensing surface 30b of sensing portion 30c of position sensor 30, variation in distance between the inner side surface of upright side wall 10b and sensing surface 30b becomes small. This can cause increase in sensing accuracy of position sensor 30 and improvement in efficiency of the mounting work. Further, lock plate 10 is used as an objective portion that is sensed by position sensor 30, whereby position sensor 30 is merely provided without using any additional member as the objective portion. This contributes to cost saving. Further, freedom of selecting a mounting position of position sensor 30 with respect to upper rail 2 can be increased.

Further, roller 4 and guide ball 5 which are different in diameter from each other are provided in order to suppress occurrence of backlash between lower rail 1 and upper rail 2 upon assembling the seat slide. That is, when the seat slide is assembled, upper rail 2 is moved relative to lower rail 1 in an up-and-down direction. By selectively using roller 4 and guide ball 5 having the different diameters, variation in the clearance between lower rail 1 and upper rail 2 can be adjusted to prevent occurrence of backlash therebetween. As a result, variation in the clearance between the lower base wall of lower rail 1 and upper wall 2d of upper rail 2 in a width direction of lower and upper rails 1 and 2 perpendicular to the longitudinal direction thereof is reduced, while there exists variation in the clearance therebetween in the up-and-down direction.

Further, position sensor 30 and lock plate 10 are arranged in the width direction of lower and upper rails 1 and 2, whereby variation in the distance between sensing surface 30b of sensing portion 30c of position sensor 30 and upright side wall 10b of lock plate 10 can be reduced. This can omit positional adjustment of position sensor 30 relative to lower rail 1 upon mounting position sensor 30 into through hole 31 of lower rail 1, resulting in enhancing the efficiency in the mounting work.

Referring to FIGS. 9A and 9B, there is shown a second embodiment of the seat slide of the present invention. The second embodiment differs in construction of lock plate 10 and arrangement of position sensor 30 with respect to lock plate 10 from the first embodiment. FIGS. 9A and 9B correspond to FIGS. 3A and 3B showing the first embodiment, respectively. Like reference numerals denote like parts, and therefore, detailed explanations therefor are omitted.

As illustrated in FIG. 9B, lock plate 10 includes upward extension 10x of upright side wall 10b. Upward extension 10x extends toward upper wall 2d of upper rail 2 from a front end portion of an upper edge of upright side wall 10b without bending relative to upright side wall 10b. As illustrated in FIG. 9A, lock plate 10 has a generally L-shape in section. Upward extension 10x is opposed to sensing surface 30b of sensing portion 30c of position sensor 30 and serves as an objective portion that is sensed by position sensor 30. In FIG. 9B, position sensor 30 is arranged in a rearward position relative to upper rail 2 which is more rearward than the position indicated in the first embodiment of FIG. 3B. Boundary point P is positioned at a rear end of upward extension 10x of upright side wall 10b of lock plate 10. When position sensor 30 is placed within region A, sensing surface 30b of sensing portion 30c of position sensor 30 is opposed to an inner side surface of upward extension 10x of upright side wall 10b of lock plate 10. At this time, position sensor 30 senses upward extension 10x of upright side wall 10b of lock plate 10 and generates an output indicating that the seat is placed in the slide position forward advanced in the fore-and-aft direction of the vehicle. On the other hand, when position sensor 30 is placed within region B, sensing surface 30b of sensing portion 30c of position sensor 30 is not opposed to the inner side surface of upward extension 10x of upright side wall 10b of lock plate 10. At this time, position sensor 30 is disabled from sensing upward extension 10x of upright side wall 10b of lock plate 10 and generates no output indicating that the seat is placed in the slide position rearward retreated in the fore-and-aft direction of the vehicle.

Figure 10A:
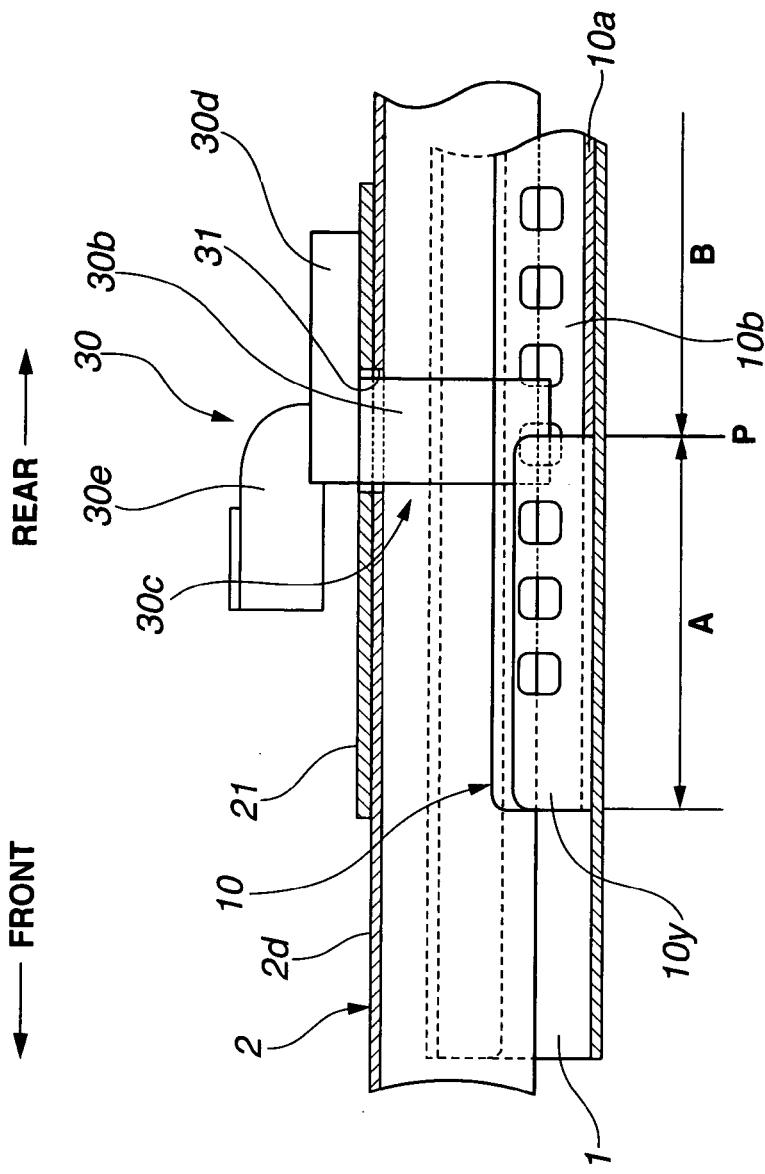
FIG. 10A is a view similar to FIG. 3A, but showing a third embodiment.
Figure 10B:
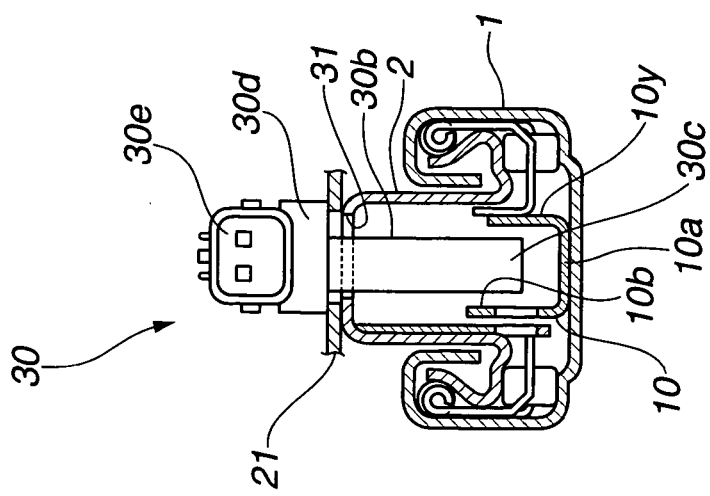
FIG. 10B is a view similar to FIG. 3B, but showing the third embodiment.

Referring to FIGS. 10A and 10B, there is shown a third embodiment of the seat slide of the present invention. The third embodiment differs in construction of lock plate 10 and arrangement of position sensor 30 with respect to lock plate 10 from the first embodiment. FIGS. 10A and 10B correspond to FIGS. 3A and 3B showing the first embodiment, respectively. Like reference numerals denote like parts, and therefore, detailed explanations therefor are omitted.

As illustrated in FIG. 10B, lock plate 10 has objective portion 10y at a front end portion thereof in the fore-and-aft direction of the vehicle. Objective portion 10y is provided in the form of a wall that extends upward from a front end portion of an opposite side edge of lower base wall 10a which is opposed to the side edge thereof connected with upright side wall 10b. Objective portion 10y is thus opposed to upright side wall 10b. Objective portion 10y has a predetermined length in the longitudinal direction of lower base wall 10a which is shorter than lower base wall 10a and upright side wall 10b. Specifically, as illustrated in FIG. 10A, objective portion 10y is spaced apart from upright side wall 10b in parallel relation thereto and cooperates with lower base wall 10a and upright side wall 10b to form a generally U-shape in section. Objective portion 10y is opposed to sensing surface 30b of sensing portion 30c of position sensor 30 and sensed by position sensor 30. In FIG. 10B, position sensor 30 is arranged in a rearward position relative to upper rail 2 which is more rearward than the position indicated in the first embodiment of FIG. 3B. Boundary point P is positioned at a rear end of objective portion 10y of lock plate 10. When position sensor 30 is placed within region A, sensing surface 30b of sensing portion 30c of position sensor 30 is opposed to an inner side surface of objective portion 10y of lock plate 10. At this time, position sensor 30 senses objective portion 10y of lock plate 10 and generates an output indicating that the seat is placed in the slide position forward advanced in the fore-and-aft direction of the vehicle. On the other hand, when position sensor 30 is placed within region B, sensing surface 30b of sensing portion 30c of position sensor 30 is not opposed to the inner side surface of objective portion 10y of lock plate 10. At this time, position sensor 30 is disabled from sensing objective portion 10y of lock plate 10 and generates no output indicating that the seat is placed in the slide position rearward retreated in the fore-and-aft direction of the vehicle.

The seat slide of the third embodiment attains the same effects as those of the seat slide of the second embodiment.

Position sensor 30 is not limited to the magnetic field-sensitive proximity sensor as described in the first through third embodiments, and may be selected from various kinds of proximity sensors including a photosensitive sensor.

Further, a part of lock plate 10 which is used as a objective portion that is sensed by position sensor 30 is not limited to the front end portion of upright side wall 10b of lock plate 10 as explained in the second and third embodiments. A rear end portion of upright side wall 10b of lock plate 10 may be used as an objective portion that is sensed by position sensor 30. In such a case, position sensor 30 senses the rear end portion of upright side wall 10b of lock plate 10 and generates an output indicating that the seat is placed in the slide position rearward retreated in the fore-and-aft direction of the vehicle. Furthermore, the part of lock plate 10 which is used as the objective portion may be desirably selected depending on the mounting position of position sensor 30 relative to upper rail 2 in the longitudinal direction thereof. This serves for increasing freedom of arrangement of position sensor 30 with respect to upper rail 2.

This application is based on a prior Japanese Patent Application No. 2005-100592 filed on Mar. 31, 2005. The entire contents of the Japanese Patent Application No. 2005-100592 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat slide for a vehicle, comprising:
   a lower rail fixed to a floor of the vehicle, the lower rail having a channel structure;
   an upper rail fixed to a seat of the vehicle, the upper rail being slidably engaged with the lower rail and having a channel structure cooperating with the channel structure of the lower rail to define an inner space therebetween;
   a lock plate disposed within the inner space between the lower and upper rails and secured to the lower rail, the lock plate extending in a fore-and-aft direction of the vehicle;
   a latch lever with a pawl, the latch lever being disposed within the inner space between the lower and upper rails and pivotally supported by the upper rail so as to be movable between a lock position where the pawl is engaged with the lock plate and an unlock position where the pawl is disengaged from the lock plate;
   a position sensor for detecting a position of the upper rail relative to the lower rail by sensing the lock plate, the position sensor being mounted to the upper rail such that a sensing portion thereof is disposed within the inner space between the lower and upper rails and opposed to the lock plate; and
   a controller connected with the position sensor,
   wherein an output from the position sensor is determined by sensing the presence or absence of the lock plate,
   wherein the controller reads the output from the position sensor and detects the position of the upper rail relative to the lower rail on the basis of the output from the position sensor to determine a position of the seat.

2. The seat slide as claimed in claim 1, wherein the sensing portion of the position sensor and the lock plate are opposed in a width direction of the lower and upper rails which extends perpendicular to a longitudinal direction thereof.

3. The seat slide as claimed in claim 1, wherein the lock plate comprises a base wall that is fixed to the lower rail and extends in the fore-and-aft direction of the vehicle, and a side wall that substantially perpendicularly extends from the base wall along the fore-and-aft direction of the vehicle and has a lock hole engageable with the pawl of the latch lever, wherein a boundary point is positioned at a front end of the side wall of the lock plate, wherein when the side wall is opposed to the sensing portion of the position sensor, the controller detects that the upper rail is placed in a position rearward retreated in the fore-and-aft direction of the vehicle relative to the lower rail on the basis of the output from the position sensor, and when the side wall is not opposed to the sensing portion of the position sensor, the controller detects that the upper rail is placed in a position forward advanced in the fore-and-aft direction of the vehicle relative to the lower rail on the basis of the output from the position sensor.

4. The seat slide as claimed in claim 1, wherein the upper rail comprises an upper wall formed with a through hole into which the position sensor is fitted.

5. The seat slide as claimed in claim 1, wherein the position sensor is arranged forward of the latch lever in the fore-and-aft direction of the vehicle.

6. The seat slide as claimed in claim 1, wherein the position sensor is a proximity sensor.

7. The seat slide as claimed in claim 1, wherein the lock plate comprises a base wall that is fixed to the lower rail and extends in a fore-and-aft direction of the vehicle, a side wall that substantially perpendicularly extends from the base wall along the fore-and-aft direction of the vehicle and has a lock hole engageable with the pawl of the latch lever, and an extension extending upward from a front end portion of the side wall, the extension being opposed to the sensing portion of the position sensor.

8. The seat slide as claimed in claim 1, wherein the lock plate comprises a base wall that is fixed to the lower rail and extends in a fore-and-aft direction of the vehicle, a side wall that substantially perpendicularly extends from the base wall along the fore-and-aft direction of the vehicle and has a lock hole engageable with the pawl of the latch lever, and an objective portion arranged to be opposed to a front end portion of the side wall, the objective portion being opposed to the sensing portion of the position sensor.

9. The seat slide as claimed in claim 8, wherein the objective portion of the lock plate comprises a wall that extends upward from a front end portion of a side edge of the base wall.

10. The seat slide as claimed in claim 6, wherein the position sensor is a magnetic field-sensitive proximity sensor.

11. A seat position sensing apparatus for a vehicle, the seat position sensing apparatus comprising:
   a fixed rail fixed to a floor of the vehicle, the fixed rail having a channel structure;
   a movable rail fixed to a seat of the vehicle and having a channel structure cooperating with the channel structure of the fixed rail to define an inner space therebetween, the movable rail being slidably engaged with the fixed rail;
   a lock mechanism for locking the movable rail on the fixed rail, the lock mechanism including a first engaging member which is disposed within the inner space between the fixed and movable rails and secured to the fixed rail, the first engaging member extending in a fore-and-aft direction of the vehicle, and a second engaging member that is disposed within the inner space between the fixed and movable rails and pivotally supported by the movable rail so as to be movable between a lock position where the second engaging member is engaged with the first engaging member and an unlock position where the second engaging member is disengaged from the first engaging member;
   a position sensing means for detecting a position of the movable rail relative to the fixed rail, the position sensing means being mounted to the movable rail so as to sense the first engaging member within the inner space between the fixed and movable rails; and
   a controller connected with the position sensing means, wherein an output from the position sensing means is determined by sensing the presence or absence of the first engaging member wherein the controller reads the output from the position sensing means and detects the position of the movable rail relative to the fixed rail on the basis of the output from the position sensing means.

12. The seat position sensing apparatus as claimed in claim 11, wherein the position sensing means conducts sensing the first engaging member in a width direction of the fixed and movable rails which extends perpendicular to a longitudinal direction thereof.

13. The seat position sensing apparatus as claimed in claim 11, wherein the first engaging member comprises a base wall that is secured to the fixed rail and extends in the fore-and-aft direction of the vehicle, and a side wall that substantially perpendicularly extends from the base wall along the fore-and-aft direction of the vehicle, wherein boundary point is positioned at a front end of the side wall of the first engaging member, wherein when the side wall is opposed to the position sensing means, the controller detects that the movable rail is placed in a position rearward retreated in the fore-and-aft direction of the vehicle relative to the fixed rail on the basis of the output from the position sensing means, and when the side wall is not opposed to the position sensing means, the controller detects that the movable rail is placed in a position forward advanced in the fore-and-aft direction of the vehicle relative to the fixed rail on the basis of the output from the position sensing means.

14. The seat position sensing apparatus as claimed in claim 11, wherein the movable rail is formed with a through hole through which the position sensing means is mounted to the movable rail.

15. The seat position sensing apparatus as claimed in claim 11, wherein the position sensing means is arranged forward of the second engaging member in the fore-and-aft direction of the vehicle.

16. The seat position sensing apparatus as claimed in claim 11, wherein the position sensing means is a proximity sensor.

17. The seat position sensing apparatus as claimed in claim 11, wherein the first engaging member comprises a base wall that is fixed to the lower rail and extends in a fore-and-aft direction of the vehicle, a side wall that substantially perpendicularly extends from the base wall along the fore-and-aft direction of the vehicle, and an extension extending upward from a front end portion of the side wall, the extension being opposed to the position sensing means.

18. The seat position sensing apparatus as claimed in claim 11, wherein the first engaging member comprises a base wall that is fixed to the lower rail and extends in a fore-and-aft direction of the vehicle, a side wall that substantially perpendicularly extends from the base wall along the fore-and-aft direction of the vehicle, and an objective portion arranged to be opposed to a front end portion of the side wall, the objective portion being opposed to the sensing portion of the position sensing means.

19. The seat position sensing apparatus as claimed in claim 18, wherein the objective portion of the first engaging member comprises a wall that extends upward from a front end portion of a side edge of the base wall.

20. The seat position sensing apparatus as claimed in claim 16, wherein the position sensing means is a magnetic field-sensitive proximity sensor.

21. The seat slide as claimed in claim 1, wherein the upper rail comprises a pair of side walls that constitutes the channel structure, and the lock plate is disposed between one of the pair of side walls of the upper rail and the position sensor.

* * * * *

UNITED STATES PATENT AND TRADEMARK OFFICE
CERTIFICATE OF CORRECTION

PATENT NO. : 7,614,597 B2  Page 1 of 1
APPLICATION NO. : 11/384396
DATED : November 10, 2009
INVENTOR(S) : Matsumoto et al.

It is certified that error appears in the above-identified patent and that said Letters Patent is hereby corrected as shown below:

Column 11, Line 17, (Claim 13, Line 6), after "wherein" insert --a--.

Signed and Sealed this
Twenty-sixth Day of June, 2012

David J. Kappos
*Director of the United States Patent and Trademark Office*